2,967,169
STABILIZED POLYPROPYLENE

Paul E. Oberdorfer, Jr., Claymont, Del., assignor to Sun Oil Company, Philadelphia, Pa., a corporation of New Jersey No Drawing. Filed July 2, 1958, Ser. No. 746,071

11 Claims. (Cl. 260—45.8)

This invention relates to the stabilization of polypropylene, and more particularly to new compositions of matter comprising a solid polymer of propylene and an inhibitor.

Such polymers can be prepared by the polymerization of the olefin using a solid catalytic material. A catalyst which is especially effective for the polymerization of propylene to relatively high molecular weight solid polymers is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing propylene to solid polymers. If desired, a lower halide such as titanium trichloride can be preformed, dispersed in an inert liquid, and an activator such as an aluminum trialkyl added. In performing the polymerization step, the propylene is contacted with the solid catalyst, such as by passing propylene into a suspension of the finely divided solid in the inert liquid reaction medium and is thereby polymerized to solid polymers. Anhydrous and oxygen-free conditions are used throughout the process, since the catalyst is deactivated by contact with water or oxygen.

Polypropylene prepared by the process as above described has a melting point of from 160° C. to 170° C., a tensile strength of from 3,000 to 6,000 p.s.i. (pounds per square inch), and an average molecular weight of from 50,000 to 350,000 or more. Usually, a mixture of crystalline and amorphous polymer is obtained. If desired, amorphous polymer can be separated from the crystalline polymer by contacting a mixture thereof with a hydrocarbon solvent such as isooctane or n-heptane at an elevated temperature. The amorphous polymer is substantially soluble under these conditions whereas the crystalline polymer is substantially insoluble. The compositions of the present invention are prepared from either crystalline or mixtures of crystalline with amorphous polymers in which the mixture contains at least 25% by weight, and preferably at least 50% by weight, of the crystalline polymer.

Such polymers may be molded or otherwise fabricated to form many useful articles. However, the polymers are susceptible to oxidation, especially at elevated temperatures. Oxidation adversely affects the physical properties of the polymer and causes a marked reduction in molecular weight. For example, the softening point, tensile strength, flexural strength and the like are adversely affected by oxidation. In addition, molded articles are discolored, being usually gray, yellow or even brown in color, which is quite objectionable in many applications of the polymer. Another difficulty encountered, especially with propylene, is that extremely severe molding conditions are required to mold the polymer, because of the high viscosity, i.e., low melt index, of the polymer at temperatures up to about 100° C. above its melting point.

An object of the present invention is to provide compositions comprising solid polymers of propylene containing a minor quantity of a material effective to prevent oxidation of the polymer. It is another object to provide compositions consisting essentially of solid polymers of propylene containing a minor quantity of a material sufficient to prevent oxidation of the polymer and to eliminate discoloration of articles molded therefrom. Still another object is to provide stable polypropylene compositions which are colorless. Yet another object is to provide an additive for polypropylene which effectively prevents color formation in articles molded from the polypropylene. An additional object is to provide easily molded polypropylene compositions which are relatively stable to oxidation, and which do not become discolored during molding. It is also an object of this invention to provide a method for preparing polypropylene of a desired lower molecular weight from a polypropylene of high molecular weight.

It has now been found that by incorporating a minor proportion of sorbide or a sorbide derivative into solid polypropylene, a composition is obtained which is inhibited against oxidation and, when molded is colorless. In another embodiment, the molecular weight of the polypropylene composition is reduced to a desired value by heating, as hereinafter described, without any discoloration of the composition. Furthermore, according to the invention, compositions having a high degree of stability and very little, if any, color are prepared by incorporating minor proportions of sorbide and a highly effective stabilizing material into the polymer.

Inhibitors have previously been proposed as additives for various materials, including some polymers. Some of these inhibitors, while effective for preventing oxidation of solid polymers of alpha-olefins, do not prevent the discoloration of articles molded from the polymer. Other inhibitors intensify or add to the color of molded articles. None of the inhibitors previously used are effective to produce a composition which, when molded, is completely colorless, as well as being inhibited against oxidation.

It is necessary to use only a small proportion of the additives of this invention to obtain relatively stable and colorless compositions. A stabilizing quantity of the inhibitor is used, which is usually from at least about .02% to about 3% or more, based on the weight of the compositions, but it is preferred to maintain the quantity within the range of from about 0.2% to 1.5% by weight, since excellent results are economically obtained therewith.

The inhibitors of this invention include sorbide and derivatives thereof. Sorbide is a white, water-soluble solid having the following structural formula:

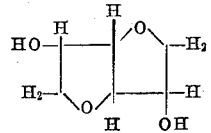

Sorbide is prepared by the dehydration of soribotol

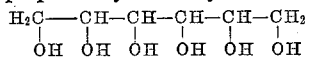

and for that reason is sometimes referred to as 1,4:3,6-dianhydrosorbitol. The compound is also known as "isosorbide," and is marketed commercially under that name by the Atlas Powder Company. For convenience, however, it will be referred to herein as "sorbide."

In addition to sorbide itself, many of its derivatives are also effective stabilizers and decolorizers for the polyolefins. For example, the ethers and esters of sorbide give good results. The stabilizers of this invention may therefore be represented by the general structural formula:

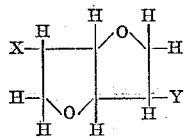

wherein X and Y are selected from the group consisting of —OR₁ and —OC(O)R₂ and each of R₁ and R₂ is hydrogen or a hydrocarbon radical, including alkyl, aryl, and aralkyl radicals having up to 20 carbon atoms, and preferably not more than 12 carbon atoms.

Sorbide ethers within the scope of this invention include sorbide dibenzyl ether, sorbide dimethyl ether, sorbide diethyl ether, and sorbide diamyl ether. Among the esters which give good results are included the diacetate, dipropionate, dibutyrate, di-2-ethyl butyrate, divalerate, dicaproate, dienanthoate, dicaprylate, dicaprate, dilaurate, dipalmitate, and dilevulinate of sorbide.

In practicing one embodiment of the present invention, an inhibiting quantity of one of the sorbide derivatives as above described, such as sorbide dibenzyl ether, within the stated concentration range is incorporated into a solid polymer of polypropylene. The incorporation can be accomplished by any convenient means, as by mechanically mixing the inhibitor and the polymer in powder form, then heating to a molten state and stirring.

Another method of incorporating the inhibitor is to prepare a slurry of the inhibitor together with the polymer in a liquid solvent for the inhibitor, such as methanol or acetone. The liquid is then evaporated from the composition. Advantageously the polymer is then heated to its melting point in an inert atmosphere and stirred to insure a uniform composition, i.e., a polymer with the inhibitor uniformly dispersed therethrough.

In another embodiment of the invention a stabilizing quantity of another inhibitor which has been found to effectively stabilize polyolefins is also incorporated into the polyolefin along with a small amount of sorbide or one of its derivatives. As previously pointed out, many effective inhibitors are known. However, discolored products are obtained when such inhibitors are used in the polyolefins. In some cases, this discoloration is due to residual catalyst or other contaminants in the polymer, while in other cases at least a portion of the color is caused by the inhibitor itself. In either event, it has been found that if a small amount, within the range hereinbefore set forth, of one of the sorbides is incorporated along with the other inhibitor, highly stable compositions are obtained which are much lighter in color than compositions which do not contain the sorbide, and which in many cases are completely colorless.

The ability of the sorbides to make polypropylene relatively stable to thermal and oxidative degradation is especially good at temperatures below about 250° C. However, the compositions may be reduced in molecular weight, without discoloration, by heating to temperatures above about 250° C. Thus the sorbides impart color stability to polypropylene even under conditions which cause degradation. This characteristic is taken advantage of in a third embodiment of the invention, wherein polypropylene compositions, containing one of the sorbides in an amount within the range hereinbefore set forth, are reduced in molecular weight by a desired, predetermined amount. This reduction in molecular weight is obtained by heating to 250° C. to 450° C., either in the presence of oxygen or in an inert atmosphere or vacuum. Previously such heating caused darkening and discoloration of the polymer, even when the heating was continued for a very short time. The reduction in molecular weight is evidenced by an increase in the melt index of the polymer, which is a measure of the viscosity of the molten polymer. The method of determining the melt index is described hereinafter.

The degree of reduction of the molecular weight of the polymer is determined by the temperature to which it is heated, the length of exposure to the heating, the amount of sorbide or sorbide derivative present, the presence of other stabilizers, and the presence or absence of oxygen. In the presence of oxygen, the molecular weight is reduced much more rapidly. Generally, from a few seconds to an hour of heating are required to reduce the molecular weight of the polypropylene sufficient to allow it to be easily molded under usual processing conditions. If the heating is carried out in a vacuum or in the presence of an inert gas, such as nitrogen, longer periods of heating, up to about 48 hours or more, may be required. Those skilled in the art can easily determine from the information set forth herein, the particular conditions required to obtain a desired reduction in molecular weight.

The reduction in molecular weight of the compositions of this invention is advantageously carried out during mechanical working of the polymer composition. For example, the composition may be milled, stirred, or extruded through a die. Much more uniform compositions result from such mechanical working.

The advantages derived from the use of sorbide and its derivatives are illustrated by the following examples. The inhibiting effect of the various stabilizers used is determined by the change of the melt index of the composition containing the inhibitor. By "melt index" is meant the rate, in grams per 10 minutes, at which the composition is extruded through an orifice 0.0823 inch in diameter from a barrel 0.3760 inch in diameter under the force of a piston weighing 2160 grams, the composition being maintained at 230° C. during the extrusion. The initial melt index ($MI_0$) was obtained, and the melt index ($MI_{30}$) was again measured after the composition had been maintained for 30 minutes at 230° C. in contact with air. An increase in the value shows oxidation and a decrease in molecular weight. The ratio $MI_{30}/MI_0$ is therefore an indication of the stability of the composition, a low value indicating a relatively stable composition.

The color of molded or extruded samples was compared with a color scale. On the scale, a No. 1 rating is water-clear, or completely colorless, a No. 2 rating has a slight yellow tinge, and a higher rating is successively darker, up to a No. 10 rating, which is a reddish brown. Compositions having a color up to and including No. 4 are acceptable for most applications.

Example 1

In this example, polypropylene having a molecular weight of about 350,000, a melting point of about 166° C. and having a crystallinity of about 50%, as determined by X-ray analysis, was used. The compositions of polypropylene with the various inhibitors were prepared by mechanically mixing 0.5% by weight of the inhibitor with the polymer in powder form, heating the mixture to above the melting point of the polymer, and stirring to obtain a homogeneous composition. Initial melt index and melt index after 30 minutes were then obtained for each composition. A ⅛ inch diameter rod was extruded from a portion of some of the compositions, and ⅛ inch thick sheets were molded from the other compositions. The color of these extruded and molded samples was then compared with the color scale. The results obtained were as follows:

| Inhibitor | $MI_0$ | $MI_{30}$ | $MI_{30}/MI_0$ | Color Rating |
|---|---|---|---|---|
| None | 0.15 | 1.27 | 8.5 | 5 |
| Sorbide dibenzyl ether | 0.15 | 0.43 | 2.9 | 1 |
| 4,4'-thio-bis(6-t-butyl-m-cresol) | 0.14 | 0.77 | 5.5 | 8 |
| 2,6-ditert-butyl-p-cresol | 0.09 | 0.21 | 2.2 | 6 |
| thiobis (di-sec-amyl-phenol) | 0.10 | 0.39 | 3.9 | 8 |
| 4,4'-methylene bis(2,6-di-t-butyl phenol) | 0.12 | 0.35 | 2.9 | 7 |
| 2,2'-methylene bis(4-ethyl-6-t-butyl phenol) | 0.08 | 0.21 | 2.6 | 8 |
| 2,6-di-t-butyl-alpha-dimethyl amino p-cresol | 0.10 | 0.21 | 2.1 | 9 |

Example 2

In this example, a different batch of polypropylene having a much higher melt index in the uninhibited state was used. The uninhibited polymer was degraded so rapidly at 230° C. that it was impossible to obtain melt index figures, since the apparatus used is not capable of accurately measuring a melt index greater than 6.0.

| Inhibitor | Percent Inh. | $MI_0$ | $MI_{30}$ | $MI_{30}/MI_0$ | Color Scale |
|---|---|---|---|---|---|
| None | | >6.0 | | | 5 |
| Sorbide | 1.0 | .21 | .78 | 3.7 | 1 |
| 4,4'-thio-bis(6-t-butyl m-cresol) | 1.0 | .17 | .58 | 3.4 | 8 |

Example 3

A composition was prepared which contained 0.5% of sorbide diacetate in polypropylene. This composition was molded into a ⅛ inch thick sheet, which had a No. 1 color. Another composition of 0.5% sorbide dimethyl ether in polypropylene was molded into a sheet having a No. 1.5 color.

Example 4

Several compositions were prepared which contained one of the sorbides in addition to one inhibitor previously found to be a good stabilizer for polypropylene. In each case the composition was found to be quite stable, and discoloration was substantially reduced. A composition of .25% each of sorbide dibenzyl ether and 2,6-di-tert-butyl-p-cresol in polypropylene had an initial melt index of 0.08, $MI_{30}/MI_0$ ratio of 3.1, and a No. 3 color. When 0.5% each of sorbide and 2,6-di-tert-butyl-p-cresol was used, the composition had an initial melt index of 0.08, and $MI_{30}/MI_0$ ratio of 2.4, and a No. 4 color.

Example 5

A composition was prepared which contained 0.5% of sorbide in polypropylene. This composition was heated to 230° C. in the presence of oxygen for 1 minute, and extruded through a ⅛ inch diameter die. The melt index was found to be 0.13. Due to its high viscosity, as indicated by the low melt index, the material was very difficult to extrude. There was, however, no discoloration.

A portion of the extruded material was then reheated to 230° C. in the presence of oxygen for a period of 1 minute and extruded again. The melt index was increased to 0.25, however, the material was still difficult to extrude. Again there was no discoloration.

A portion of the latter material was heated a third time, this time to 290° C. in the presence of oxygen, for 5 minutes. The melt index was increased to 1.85, and the material was easily extruded or molded. Samples molded from this material were strong and flexible, and were not discolored.

As previously shown herein, sorbide and its derivatives may be used in conjunction with other stabilizers for increased stability of the polymer compositions. Stabilizers heretofore taught in the art can be used. Also, many phenols and bisphenols, including those shown in the examples herein; aryl amines, such as phenyl alpha naphthylamine and N,N'-di-sec-octyl-p-phenylenediamine; the tetralkyl thiuram disulfides; and the zinc dialkyldithiocarbamates, have been found to give excellent results when used together with sorbide or its derivatives. Normally, from about 0.02% to about 2% of such stabilizers are employed.

Another advantage derived from the use of sorbide and its derivatives as antioxidants for polypropylene is the complete lack of odor of the compositions. Many of the better anti-oxidants previously used impart a disagreeable odor to the composition which is extremely undesirable in many applications of polypropylene, especially those where the polypropylene is fabricated into films and containers which are used in contact with foods.

Sorbide and its derivatives also impart a high degree of resistance to discoloration of polypropylene in sunlight. Molded samples of the compositions described in the examples herein were exposed to sunlight for several weeks. None of the compositions containing sorbide or one of its derivatives changed in color, whereas all the other compositions became progressively darker.

The compositions of this invention can be molded, extruded, or otherwise fabricated into many useful articles, including films, sheets, containers, and tubular goods. Due to the lack of color of the compositions, coloring agents may be incorporated into the compositions to obtain any desired color in clear, bright tones. Plasticizers and other additives may also be incorporated into the compositions to vary the physical properties.

The invention claimed is:

1. A composition of matter comprising a solid polymer of propylene and from about 0.02% to about 3% by weight of a compound having the general structural formula:

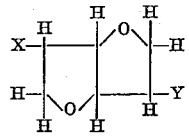

wherein X and Y are each selected from the group consisting of radicals having the formula: —$OR_1$ and —$OC(O)R_2$ wherein each of $R_1$ and $R_2$ is selected from the group consisting of hydrogen and hydrocarbon radicals having from 1 to 20 carbon atoms.

2. A new composition of matter as defined by claim 1 wherein the compound is sorbide.

3. A new composition of matter as defined by claim 1 wherein the compound is sorbide dibenyl ether.

4. The composition of claim 1, wherein said compound is sorbide diacetate.

5. The composition of claim 1 wherein said compound is sorbide dimethyl ether.

6. A process for preparing substantially colorless polymers of reduced molecular weight which comprises heating a composition comprising a high molecular weight solid polymer of propylene and from about 0.02% to about 3% by weight of a compound having the general structural formula:

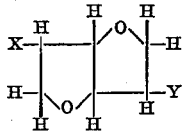

wherein X and Y are each selected from the group consisting of radicals having the formula: —$OR_1$ and —$OC(O)R_2$ wherein each of $R_1$ and $R_2$ is selected from the group consisting of hydrogen and hydrocarbon radicals having from 1 to 20 carbon atoms.

7. A process as defined by claim 6 wherein the polymer is polypropylene having a molecular weight in excess of 50,000.

8. The process of claim 6, wherein said compound is sorbide.

9. The process of claim 6, wherein said compound is sorbide dibenzyl ether.

10. The process of claim 6, wherein said compound is sorbide diacetate.

11. The process of claim 6, wherein said compound is sorbide dimethyl ether.

No references cited.